United States Patent [19]

Caiozza

[11] Patent Number: 5,510,024
[45] Date of Patent: Apr. 23, 1996

[54] FILTER CARTRIDGE MAGNETIC ATTACHMENT

[76] Inventor: Joseph C. Caiozza, 321 W. Market St., Long Beach, N.Y. 11561

[21] Appl. No.: 316,551

[22] Filed: Sep. 30, 1994

[51] Int. Cl.$^6$ ............................................. B01D 35/06
[52] U.S. Cl. ............................................. 210/186; 210/223
[58] Field of Search ........................... 210/186, 222, 210/223; 335/302, 304, 306; 184/6.25

[56] References Cited

U.S. PATENT DOCUMENTS 5,051,200  9/1991  Srail et al. ..................... 252/62.54
5,078,871  1/1992  McCready ....................... 210/223

*Primary Examiner*—Matthew O. Savage

[57] ABSTRACT

A magnet assembly or attachment for magnetically collecting metallic particles within a filter. The inventive device includes a pair of magnets supported in a spaced relationship by a carrier which latter is positionable along an exterior of a filter cartridge. The carrier serves the dual function of a heat sink. A shunt couples opposite poles of the magnets together to increase the magnetic flux directed into the filter cartridge to separate and retain metallic particles from the filtered fluid.

10 Claims, 5 Drawing Sheets

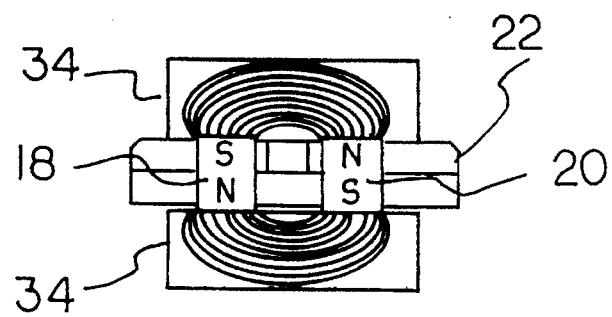
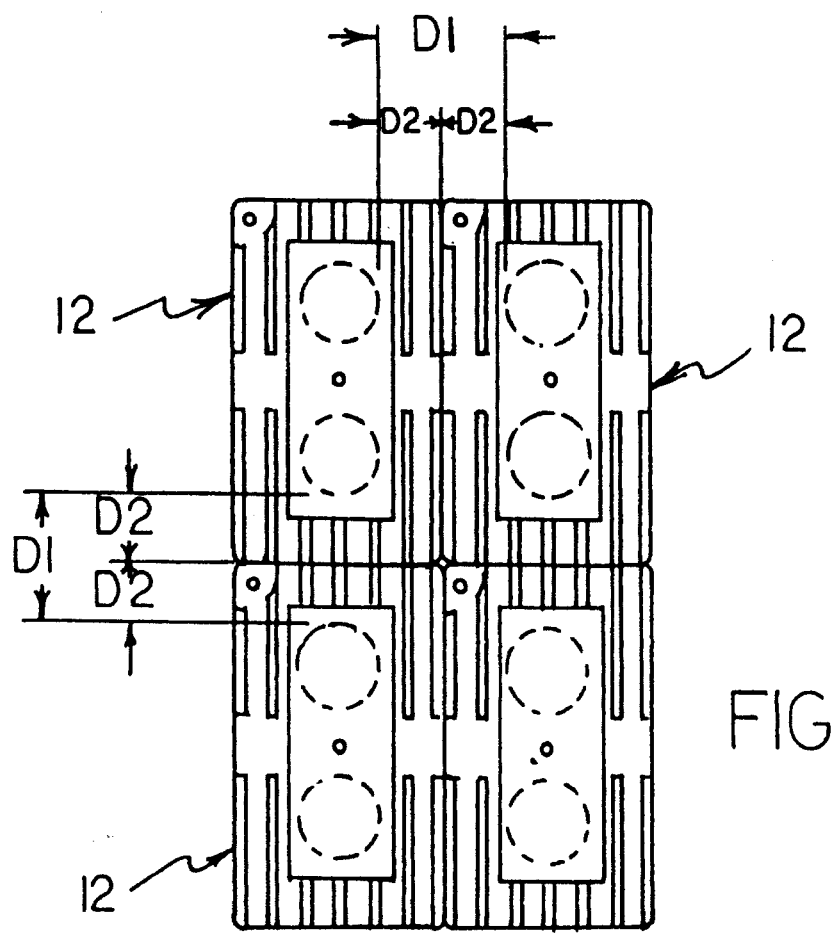

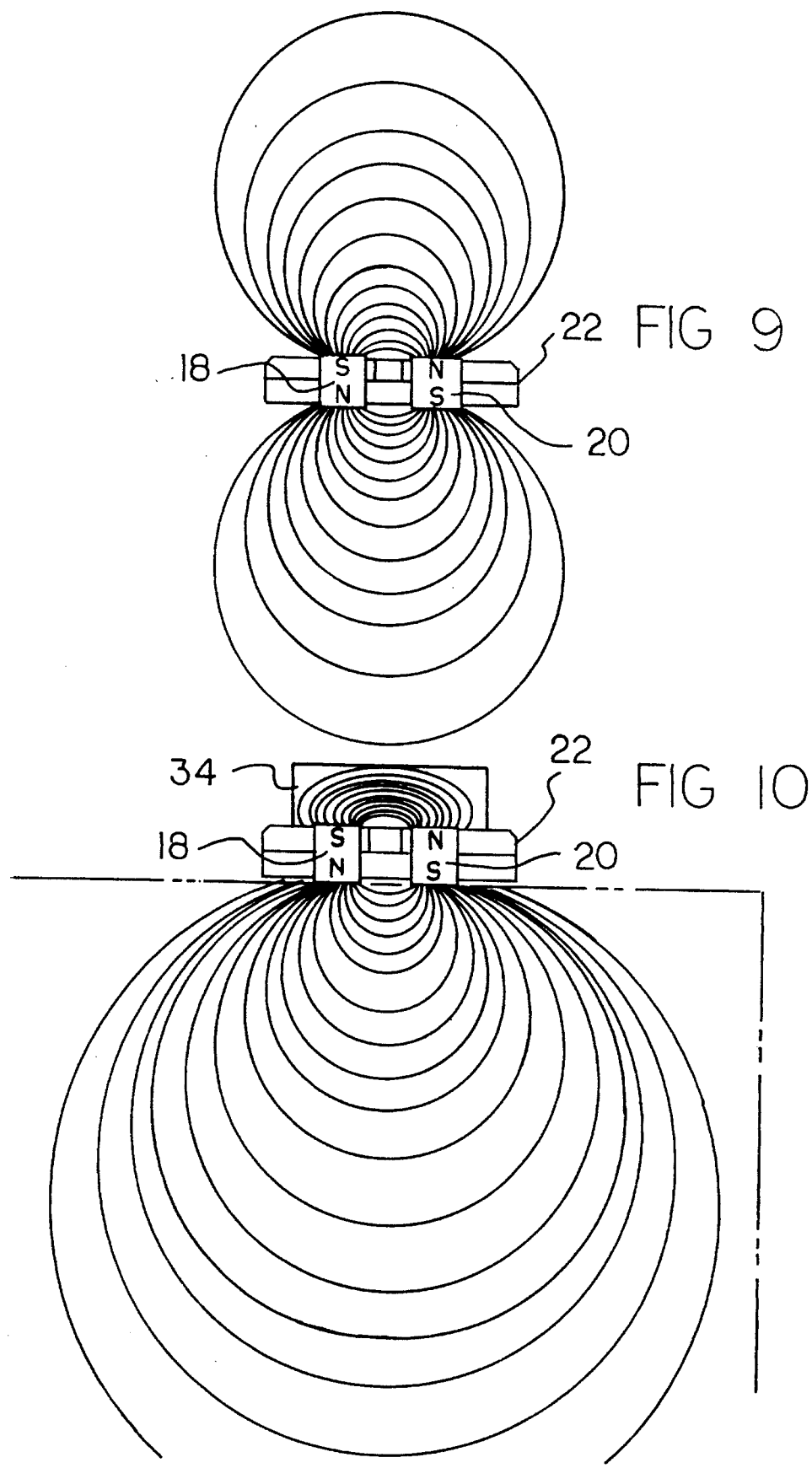

FILTER CARTRIDGE MAGNETIC ATTACHMENT

BACKGROUND OF THE INVENTION

1. Field of the Invention

The present invention relates to an improved magnet assembly, and more particularly, to a magnet assembly especially useful as a filtering device or as a filter cartridge magnetic attachment for magnetically collecting metallic particles within a filter.

2. Description of the Prior Art

The use of filtering devices is known in the prior art. In my prior patent U.S. Pat. No. 5,273,648 there is disclosed a magnet block member for mounting on the exterior of an oil filter cartridge. Other known prior art filtering devices are disclosed in the following: U.S. Pat. No. 4,894,153; U.S. Pat. No. 4,265,755; U.S. U.S. Pat. No. 3,460,679; and Japanese Patent 11,365.

While these devices fulfill their respective, particular objectives and requirements, the aforementioned patents do not disclose a magnet assembly or a filter cartridge magnetic attachment for magnetically collecting metallic particles within a filter which includes a pair of magnets supported in a spaced relationship by a carrier positionable along an exterior of a filter cartridge, wherein the carrier serves the dual function of a heat sink, and wherein the assembly further includes a shunt coupling opposite poles of the magnets together to increase the magnetic flux directed into the filter cartridge to separate and retain metallic particles from the filter fluid.

In these respects, the magnet assembly or filter cartridge magnetic attachment according to the present invention substantially departs from the conventional concepts and designs of the prior art, achieves many advantages in effectiveness of operation, and in so doing, provides an apparatus developed for the purpose of magnetically collecting metallic particles within a filter which constitutes a significant advance in the art of such devices.

SUMMARY OF THE INVENTION

In view of the foregoing disadvantages inherent in the known types of filtering devices now present in the prior art, the present invention provides a new magnet assembly or filter cartridge magnetic attachment construction wherein the same can be utilized for magnetically collecting metallic particles within a filter of an engine or other apparatus. As such, the general purpose of the present invention, which will be described subsequently in greater detail, is to provide a new filter cartridge magnetic attachment apparatus and method which has many of the advantages of the filtering devices mentioned heretofore and many novel features that result in a filter cartridge magnetic attachment which is not anticipated, rendered obvious, suggested, or even implied by any of the prior art filtering devices, either alone or in any combination thereof.

To attain this, the present invention generally comprises a unique magnet assembly or attachment for magnetically collecting metallic particles within a filter or filter cartridge. The inventive device, briefly described, includes a pair of permanent magnets carried or mounted in a spaced relationship in a support member on the exterior of a filter cartridge with the support member serving the dual function of a heat sink. A shunt couples opposite poles of the magnets together to increase the magnetic flux directed into the filter cartridge to thereby increase the effectiveness of the magnet assembly to separate and retain metallic particles from the filtered fluid.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new magnet assembly and a new filter cartridge magnetic attachment apparatus and method which has many of the advantages of the filtering devices mentioned heretofore and many novel features that result in a magnet assembly or filter cartridge magnetic attachment which is not anticipated, rendered obvious, suggested, or even implied by any of the prior art filtering devices, either alone or in any combination thereof.

It is another object of the present invention to provide a new magnet assembly or filter cartridge magnetic attachment which may be easily and efficiently manufactured and marketed.

It is a further object of the present invention to provide a new magnet assembly or filter cartridge magnetic attachment which is of a durable and reliable construction.

An even further object of the present invention is to provide a new magnet assembly or filter cartridge magnetic attachment which is susceptible of a low cost of manufacture with regard to both materials and labor, and which accordingly is then susceptible of low prices of sale to the consuming public, thereby making such filter cartridge magnetic attachments economically available to the buying public.

Still yet another object of the present invention is to provide a new magnet assembly or filter cartridge magnetic attachment which provides in the apparatuses and methods of the prior art some of the advantages thereof, while simultaneously overcoming some of the disadvantages normally associated therewith.

Still another object of the present invention is to provide a new magnet assembly or filter cartridge magnetic attachment for magnetically collecting metallic particles within a filter, such as an oil filter of an internal combustion engine or the like.

Yet another object of the present invention is to provide a new magnet assembly or filter cartridge magnetic attachment which includes a pair of magnets supported in a spaced relationship by a heat sink positionable along an exterior of a filter cartridge, and a shunt coupling opposite poles of the magnets together to increase the magnetic flux directed into the filter cartridge to separate and retain metallic particles from the filter fluid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a top plan view of a plurality of magnetic attraction means positioned in an abutting relationship relative to one another.

FIG. 9 is a schematic diagram of the magnetic field flux lines of the magnet assembly of the present invention without the shunt in place.

FIG. 10 is a schematic diagram of the magnetic field flux lines of the magnet assembly of the present invention with the shunt in place and with the filter cartridge being indicated by broken lines.

FIG. 11 is a schematic diagram of the magnetic field flux lines of the present invention with a pair of shunts (i.e. both top and bottom) in place.

DESCRIPTION OF THE PREFERRED EMBODIMENT

Figure 1:
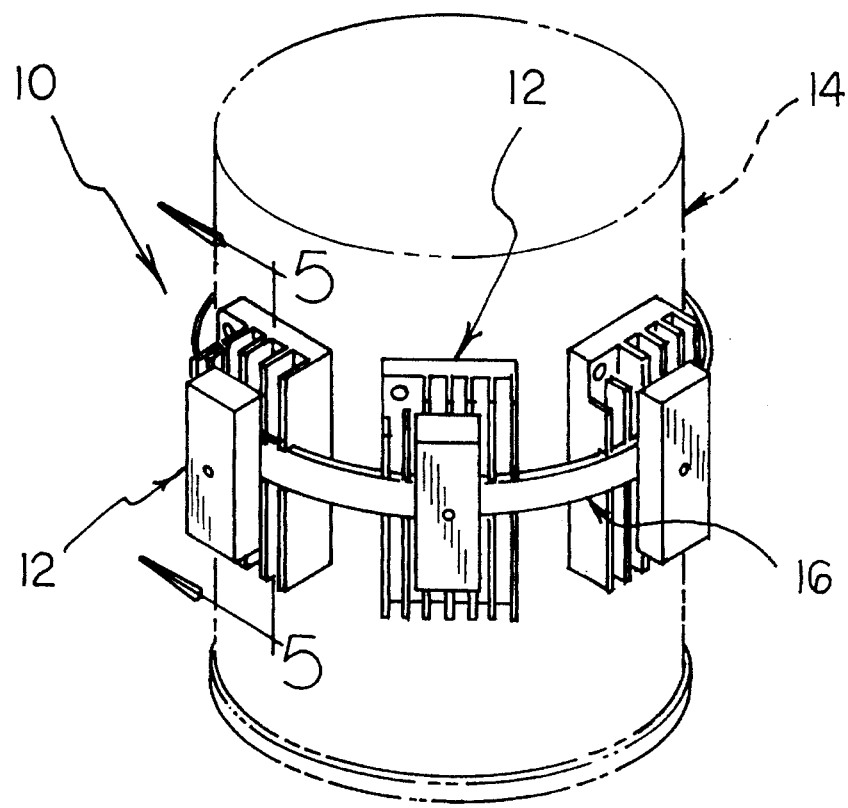
FIG. 1 is an isometric illustration of a filter cartridge attachment according to the present invention as secured to a filter cartridge.
Figure 2:
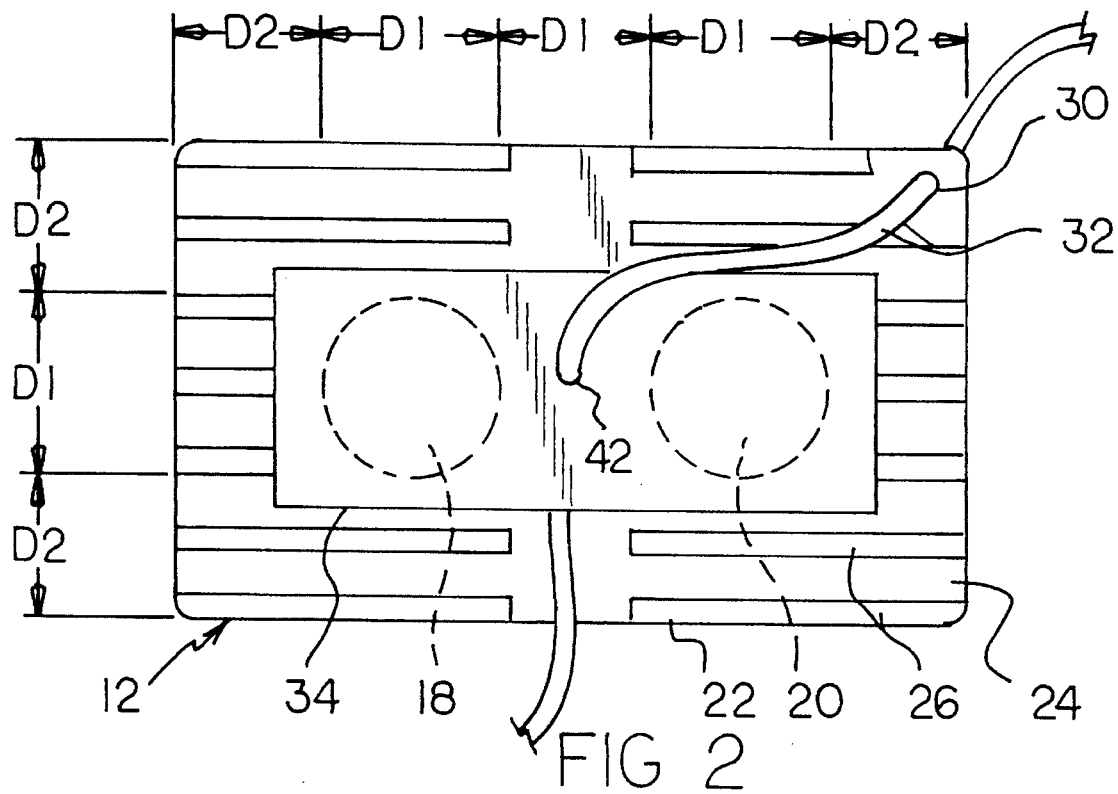
FIG. 2 is a top plan view of a magnetic attraction means or magnet assembly according to the present invention.

With reference now to the drawings, and in particular to FIGS. 1–11 thereof, a new magnet assembly or filter cartridge magnetic attachment embodying the principles and concepts of the present invention and generally designated by the reference numeral 10 will be described.

More specifically, it will be noted that the filter cartridge magnetic attachment 10 comprises at least one, and preferably a plurality of, magnetic attraction means 12 couplable to an exterior of a filter cartridge 14, such as an oil filter of an internal combustion engine or the like, for magnetically attracting and retaining metallic particles within the filter. A strap means 16 is coupled to the plurality of magnetic attraction means 12 for securing the magnetic attraction means to the filter and maintaining a radial spacing between adjacent magnetic attracting means.

FIGS. 2 through 5 and 10 illustrate a single magnetic attraction means 12 and it can be shown from these figures that each of the magnetic attraction means comprises a first magnet 18 spaced from a second magnet 20. The magnets preferably are of the well known "permanent magnet" type and each includes north and south poles (see FIG. 10) which are oriented in opposite directions. That is, the north pole on the first magnet is opposed to the south pole of the second magnet and vice versa substantially as schematically illustrated. A particularly preferred material for magnets 18 and 12 is neodymium iron boron, but as those with ordinary skill in the art will appreciate other known permanent magnetic material may be employed instead.

Figure 5:
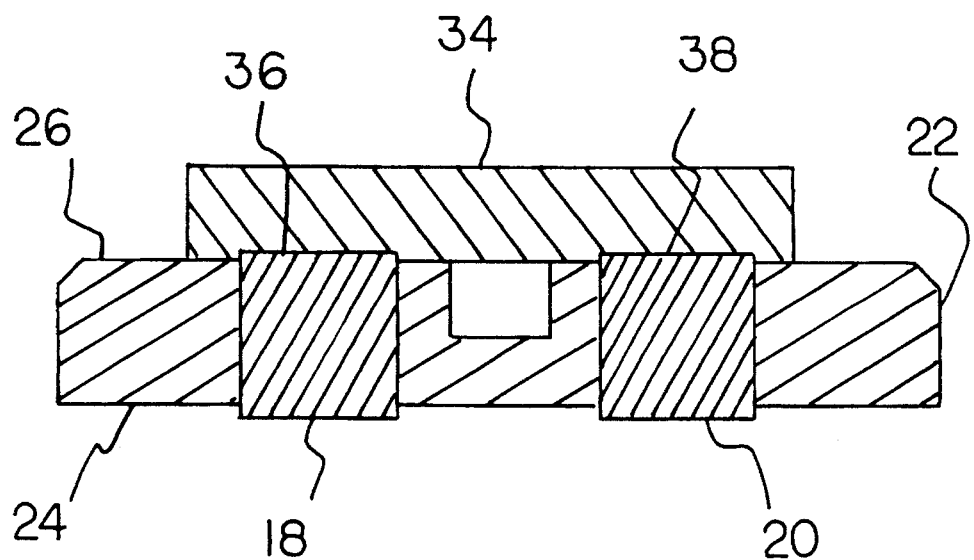
FIG. 5 is a cross sectional view taken along line 5—5 of FIG. 1.

A carrier 22 which serves the dual function of a heat sink supports the magnets 18, 20 in the spaced position illustrated in the drawings. Both of the magnets 18, 20 are substantially cylindrical in shape and have a diameter "D1" of preferably approximately ½ inch. The magnets 18, 20 extend through unlabeled apertures in the carrier or heat sink 22 and are retained relative to the heat sink through a frictional or interference fit, or alternatively, through the use of an appropriate adhesive, welding or the like. As shown in FIG. 5, the magnets 18, 20 preferably project both slightly above and below the heat sink 22.

The carrier or heat sink 22 serves not only to retain the magnets 18, 20 in the spaced relationship illustrated in the drawings, but also serves to dissipate heat conducted into the magnets through the filter 14, thereby reducing the effects of high temperature on the magnetic flux generated by the magnets. In other words, hot fluids being filtered by the filter cartridge 14 will subsequently heat an exterior of the filter and the magnetic attraction means 12 attached thereto. Because the magnetic flux generated by each of the magnets 18, 20 decreases as the temperature thereof increases, the heat sink 22 serves to reduce the temperature of the magnets, thereby increasing the flux generated thereby when placed in a hot environment of an engine compartment, for example. The carrier 22 comprises a substantially planar base plate 24 having a plurality of spaced heat transfer fins 26 projecting substantially orthogonally therefrom, with each of the heat transfer fins 26 comprising an elongated planar member formed of a heat conductive material. The heat transfer fins 26 are separated by a transverse slot 28 extending across the heat fins which permits a passage of the strap means 16 thereacross, as shown in FIG. 1. Preferably, the base plate 24 includes a corner aperture 30 permitting the passage of a securing wire 32 therethrough so as to couple adjacent magnetic attraction means together to preclude loss during installation and/or removal of the device 10.

The base plate 24 of the carrier 22 includes an exterior perimeter edge from which the magnets 18, 20 are spaced. In this respect, it is desirable for the magnets 18, 20 to be spaced a distance apart equivalent to the diameter thereof. In other words, the base plate/heat sink 22 serves to position the magnets 18, 20 a distance apart equal to the diameter "D1", as show in FIG. 2. Further, the heat sink 22 positions each one of the magnets 18, 20 a second distance "D2" from the perimeter edge of the base plate 24. Preferably, the second distance "D2" is equal to approximately ½ of the first distance "D1", whereby a placement of a plurality of the magnetic attraction means 12 in an abutting relationship as illustrated in FIG. 6 will continue to position adjacent magnets a minimum distance equal to the first distance "D1". By this preferred arrangement of structure, a plurality of the magnetic attraction means 12 can be positioned into a matrix to completely surround an exterior of the associated filter 14. Such spacing of the magnets 18, 20 the first distance "D1" apart has been found to provide for a maximum magnetic field intensity within the filter during use of the device 10.

Figure 3:
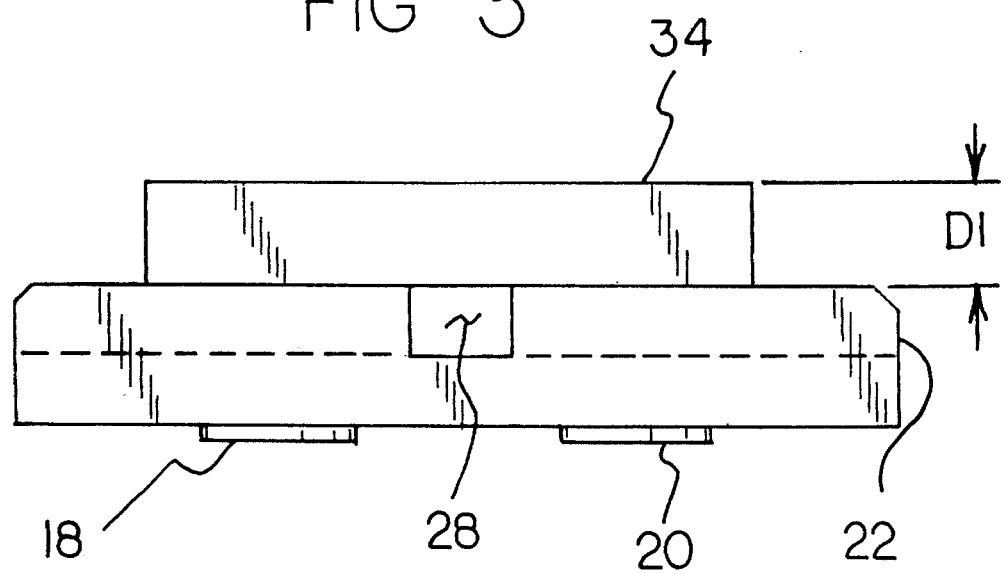
FIG. 3 is a side elevation view of the magnetic attraction means of FIG. 2.
Figure 4:
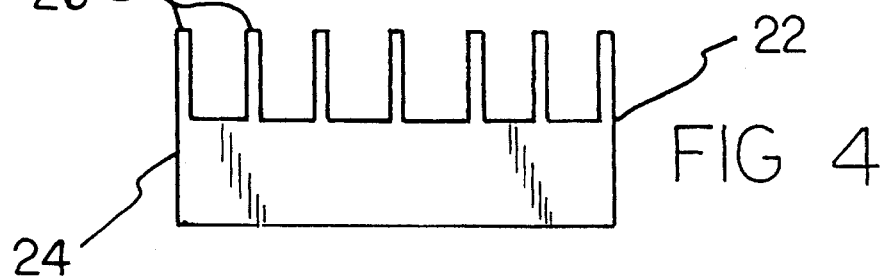
FIG. 4 is an end elevation view of the magnetic attraction means of FIG. 3.

As shown in FIGS. 3 and 5, and in accordance with an important feature of the present invention, each of the magnetic attraction means 12 further comprises a shunt 34 which couples the magnetic flux directed from the upper ends of the magnets 18, 20 together, thereby increasing the magnetic flux directed from the lower ends of the magnets and into the filter 14 to retain a greater quantity of metallic particles therewithin. To this end, the shunt 34 comprises an elongated bar member having a height preferably equal to the first distance "D1". A first recess 36 is directed into the elongated bar member forming a shunt 34 and is operable to receive an upper end of the first magnet 18. Similarly, a second recess 38 is directed into the shunt bar member and positioned so as to receive an upper end of the second magnet 20. As shown in FIGS. 5 and 10, the shunt 34 operates to magnetically couple the upper ends of the magnets 18, 20 together. The shunt 34 is retained relative to the magnets 18, 20 and the heat sink 22 by the magnetic attraction of the magnets. Such magnetic coupling of the magnets 18, 20 together emulates the increase in magnetic flux found within a horseshoe magnet. The flux generated by the magnetic attraction means 12 is directed through the exterior surface of the filter 14 so as to attract and retain the metallic particles within the filter. Moreover, through a use of the shunt 34, the magnetic field generated by the magnets 18, 20 is directed through a filtering web 40 within the filter 14 to similarly capture and retain metallic particles proximal to the web. The removal of such metallic particles from the fluid being filtered by the filter 14 serves to increase an operating life of the associated internal combustion engine or other apparatus. Preferably, the shunt 34 also includes a retaining aperture 42 through which the securing wire 34 extends to preclude a loss of the shunt during disassembly of the device 10.

Figure 7:
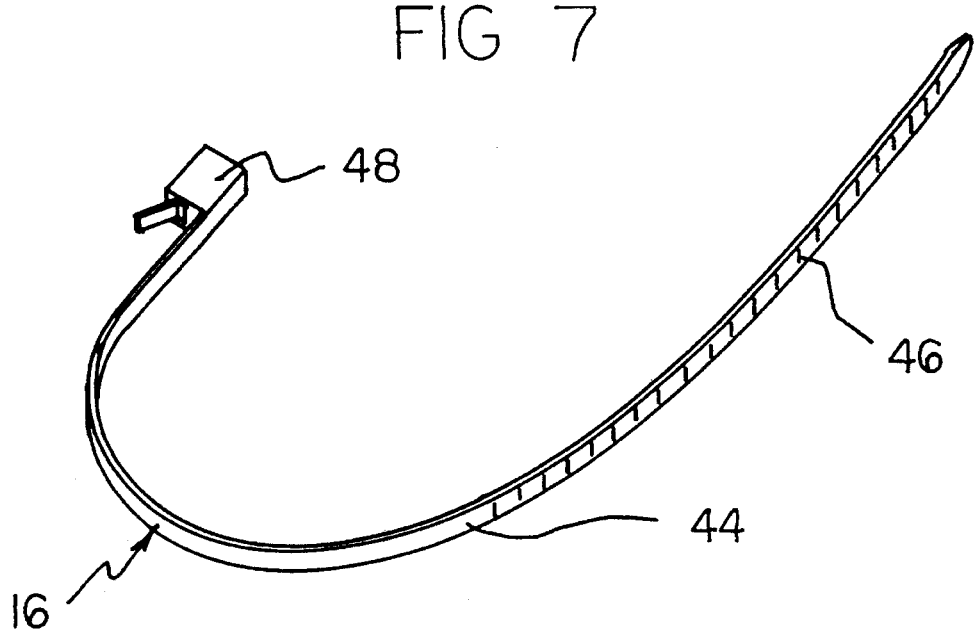
FIG. 7 is a isometric illustration of a portion of the present invention.

Turning now to FIG. 7, wherein the strap means 16 of the present invention 10 is illustrated, it can be shown that the strap means preferably comprises an elongated flexible strap 44 having a plurality of serrations 46 extending therealong. A releasable lock 48 is secured to a first end of the flexible strap 44 and operates to receive a second end of the strap 44 therewithin to engage the serrations 46 and lock the strap means 16 about an associated filter, as shown in FIG. 1.

Figure 8:
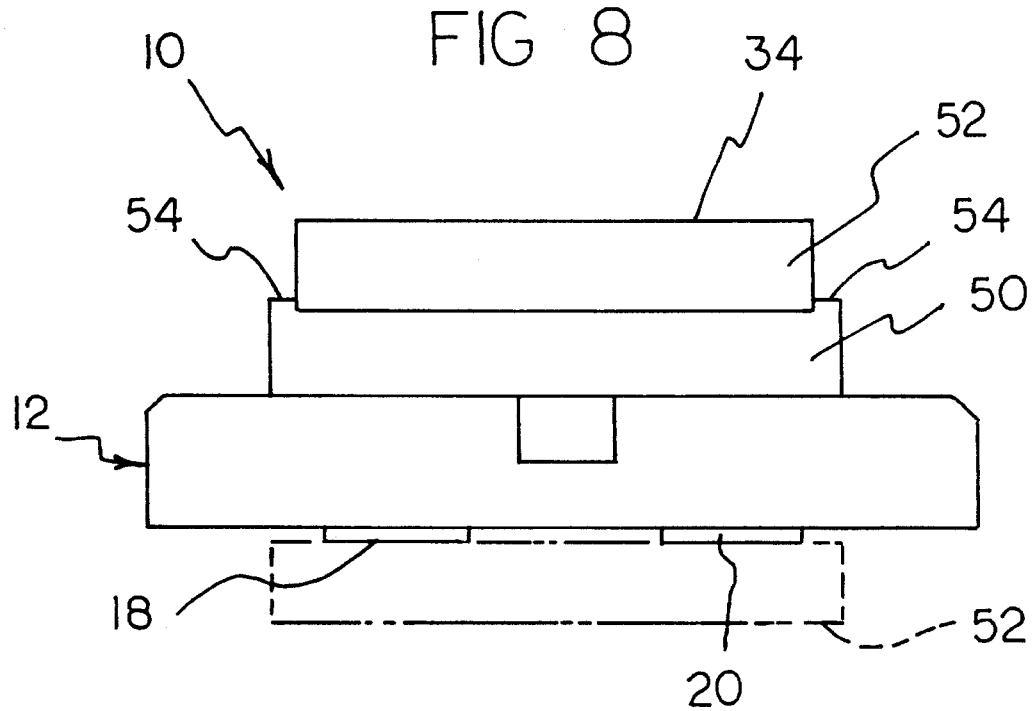
FIG. 8 is a side elevation view of an alternative form of the present invention.

FIG. 8 illustrates an alternative form of the present invention 10 and it can be shown from this figure that the shunt 34 of the magnetic attraction means 12 may alternatively comprise a first shunt member 50 magnetically coupled to a second shunt member 52. The first shunt member 50 includes the first and second recesses 36 and 38 directed thereinto which receive the upper ends of the first and second magnets 18, 20. The second shunt member 52 is retained relative to the first shunt member 50 by the magnetic flux passing through the shunt 34. In other words, the magnetic attraction generated by the first and second magnets 18, 20 serves to retain the shunt members 50, 52 relative to one another. The first shunt 50 additionally includes a pair of upwardly extending ridges 54 at opposed ends thereof which cooperate to retain the second shunt member 52 in a desired longitudinal orientation relative to the first shunt member 50. The second shunt member 52 is operable to be decoupled from the first shunt member 50 and magnetically coupled to lower ends of the first and second magnets 18, 20, as shown in phantom illustration of FIG. 8 to preclude magnetic attraction of the device 10 towards metallic objects during shipping and/or storage of the device.

In use, the filter cartridge magnetic attachment 10 can be easily attached about the circumferential exterior surface of a filter cartridge 14, as shown in FIG. 1. The magnetic flux generated by the magnets 18, 20 and increased by the magnetic coupling of the magnets together by the shunt 34 will then be directed into the filter 14 to capture and retain metallic particles circulating therewithin. The present invention 10 is partially useful in the capturing and retaining of microscopic metallic particles capable of passing through the filtering web 40, thereby reducing the abrasive quality of the fluid being filtered to extend the operating life of the associated internal combustion engine or other apparatus.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and descried, and accordingly, all suitable modifications and equivalents may be resorted to, falling within the scope of the invention.

What is claimed as being new and desired to be protected by LETTERS PATENT of the United States is as follows:

1. A magnet assembly useful as a filter cartridge magnetic attachment comprising:

a magnetic attraction means couplable to an exterior of a filter cartridge for magnetically attracting and retaining metallic particles within said filter cartridge;

and, a strap means for securing said magnetic attraction means to said filter cartridge, wherein said magnetic attraction means comprises a carrier having a first aperture extending therethrough spaced from a second aperture extending therethrough; a first magnet positioned within said first aperture; and a second magnet positioned within said second aperture.

2. The filter cartridge magnetic attachment of claim 1, wherein each of said first and second magnets has a first end and a second end, said magnetic attraction means further comprises a shunt coupled to said first ends of said magnets for coupling magnetic flux directed from said first ends of said magnets together, thereby increasing magnetic flux directed from said second ends of said magnets.

3. The filter cartridge magnetic attachment of claim 2, wherein said magnets are substantially cylindrical in shape and have a diameter of a first distance with said magnets being spaced apart said first distance.

4. The filter cartridge magnetic attachment of claim 3, wherein said carrier comprises a substantially planar base plate having a plurality of heat fins projecting substantially orthogonally therefrom, with said heat fins being separated by a transverse slot extending thereacross permitting a passage of said strap means over said base plate.

5. The filter cartridge magnetic attachment of claim 4, wherein said base plate of said carrier includes an exterior perimeter edge from which said magnets are spaced, said magnets being spaced a second distance from said exterior perimeter edge, with said second distance being approximately equal to one half of said first distance.

6. The filter cartridge magnetic attachment of claim 5, wherein said shunt comprises an elongated bar member having a height equal to said first distance, said bar member having a first recess directed thereinto receiving the first end of said first magnet, and a second recess directed into said bar member receiving the first end of said second magnet.

7. The filter cartridge magnetic attachment of claim 1 wherein at least said first magnet is comprised of neodymium iron boron.

8. The filter cartridge magnetic attachment of claim 1 wherein said first magnet and said second magnet are comprised of neodymium iron boron.

9. A filter cartridge magnetic attachment comprising:

a magnetic attraction means couplable to an exterior of a filter cartridge for magnetically attracting and retaining metallic particles within said filter cartridge, said magnetic attraction means comprising a heat sink having a first aperture extending therethrough spaced from a second aperture extending therethrough, said heat sink including a substantially planar base plate having a plurality of heat fins projecting substantially orthogonally therefrom, with said heat fins being separated by a transverse slot extending thereacross permitting a passage of said strap means over said base plate; a first magnet positioned within said first aperture of said heat sink, said first magnet having a first end and a second end; a second magnet positioned within said second aperture of said heat sink, said second magnet having a first end and a second end, and a shunt coupled to said first ends of said magnets for coupling magnetic flux directed from said first ends of said magnets together, thereby increasing magnetic flux directed from said second ends of said magnets, said magnets being substantially cylindrical in shape and having a diameter of a first distance with said magnets being spaced apart said first distance, said base plate of said heat sink further including an exterior perimeter edge from which said magnets are spaced, said magnets being spaced a second distance from said exterior perimeter edge, with said second distance being approximately equal to one half of said first distance, wherein said shunt comprises an elongated bar member having a height equal to said first distance, said bar member having a first recess directed thereinto receiving said first end of said first magnet, and a second recess directed into said bar member receiving said first end of said second magnet;

and, a strap means for securing said magnetic attraction means to said filter cartridge, said strap means comprising an elongated flexible strap having a plurality of serrations extending therealong; a releasable lock secured to a first end of said flexible strap for receiving a second end of said strap therewithin to engage said serrations and lock said second end of said strap means proximal to said first end thereof.

10. A filter cartridge magnetic attachment comprising:

a magnetic attraction means couplable to an exterior of a filter cartridge for magnetically attracting and retaining metallic particles within said filter cartridge, said magnetic attraction means comprising a heat sink having a first aperture extending therethrough spaced from a second aperture extending therethrough, said heat sink including a substantially planar base plate having a plurality of heat fins projecting substantially orthogonally therefrom, with said heat fins being separated by a transverse slot extending thereacross for permitting a passage of a strap means over said base plate; a first magnet positioned within said first aperture of said heat sink, said first magnet having a first end and a second end; a second magnet positioned within said second aperture of said heat sink, said second magnet having a first end and a second end, and a shunt coupled to said first ends of said magnets for coupling magnetic flux directed from said first ends of said magnets together, thereby increasing magnetic flux directed from said second ends of said magnets, said magnets being substantially cylindrical in shape and having a diameter of a first distance with said magnets being spaced apart said first distance, said base plate of said heat sink further including an exterior perimeter edge from which said magnets are spaced, said magnets being spaced a second distance from said exterior perimeter edge, with said second distance being approximately equal to one half of said first distance, wherein said shunt comprises a first shunt member coupled to said first ends of said magnets; and a second shunt member magnetically coupled to said first shunt member, said first shunt member including a first recess directed thereinto receiving said first end of said first magnet, and a second recess directed into said first shunt member receiving said first end of said second magnet;

and, a strap means extending through said transverse slot for securing said magnetic attraction means to said filter cartridge, said strap means comprising an elongated flexible strap having a plurality of serrations extending therealong; a releasable lock secured to a first end of said flexible strap for receiving a second end of said strap therewithin to engage said serrations and lock said second end of said strap means proximal to said first end thereof.

* * * * *